(12) United States Patent
Rich

(10) Patent No.: US 6,257,062 B1
(45) Date of Patent: Jul. 10, 2001

(54) ANGULAR ACCELEROMETER

(75) Inventor: David Boyd Rich, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/410,712

(22) Filed: Oct. 1, 1999

(51) Int. Cl.$^7$ ................................................. G01P 15/125
(52) U.S. Cl. ................................... 73/514.32; 73/514.38
(58) Field of Search .......................... 73/514.01, 514.16, 73/514.32, 514.38, 514.17

(56) References Cited

U.S. PATENT DOCUMENTS

| | | | |
|---|---|---|---|
| 2,912,657 | 11/1959 | Schaevitz | 336/30 |
| 2,916,279 | 12/1959 | Stanton | 264/1 |
| 4,435,737 | 3/1984 | Colton | 361/280 |
| 4,699,006 | 10/1987 | Boxenhorn | 73/517 |
| 4,736,629 | 4/1988 | Cole | 73/517 R |
| 4,805,456 | 2/1989 | Howe et al. | 73/517 |
| 4,851,080 | 7/1989 | Howe et al. | 156/647 |
| 5,092,174 | 3/1992 | Reidemeister et al. | 73/517 R |
| 5,146,389 | 9/1992 | Ristic et al. | 361/283 |
| 5,226,321 | 7/1993 | Varnham et al. | 73/505 |
| 5,233,213 | 8/1993 | Marek | 257/415 |
| 5,249,465 | 10/1993 | Bennett et al. | 73/510 |
| 5,251,484 | 10/1993 | Mastache | 73/517 A |
| 5,253,526 | 10/1993 | Omura et al. | 73/517 R |
| 5,314,572 | 5/1994 | Core et al. | 156/643 |
| 5,345,824 | 9/1994 | Sherman et al. | 73/517 B |
| 5,349,858 | 9/1994 | Yagi et al. | 73/517 A |
| 5,388,460 | 2/1995 | Sakurai et al. | 73/517 R |
| 5,417,111 | 5/1995 | Sherman et al. | 73/517 R |
| 5,540,095 | 7/1996 | Sherman et al. | 73/514.18 |
| 5,665,915 | 9/1997 | Kobayashi et al. | 73/514.32 |
| 5,847,280 | 12/1998 | Sherman et al. | 73/514.32 |

FOREIGN PATENT DOCUMENTS

| | | | |
|---|---|---|---|
| 0583397 | 12/1977 | (RU) | 73/517 A |
| 1035523 | 8/1983 | (RU) | 73/517 A |
| 1040424 | 9/1983 | (RU) | 73/517 A |

OTHER PUBLICATIONS

"Rejecting Rotational Disturbances on Small Disk Drives Using Rotational Accelerometers" Daniel Y. Abramovitch, 1996 IFAC World Congress in San Francisco, CA 1996, pp. 1–6.

"Increased Disturbance Rejection in Magnetic Disk Drives by Acceleration Feedforward Control and Parameter Adaption" M.T. White and M. Tomizuka, vol. 5, No. 6, 1997, pp. 741–751.

"Surface Micromachined Angular Accelerometer with Force Feedback" T.J. Brosnihan, A.P. Pisano and R. T. Howe, DSC–vol. 57–2, 1995, IMECE pp. 941–947.

"Embedded Interconnect and Electrical Isolation for High–Aspect–Ratio, SOI Inertial Instruments" T. J. Brosnihan, J.R. Bustillo, A.P. Pisano and R.T. Howe, 1996 International Conference on Solid–State Sensors and Actuators, Chicago, Jun. 16–19, 1997, pp. 637–640.

Primary Examiner—Richard A. Moller
(74) Attorney, Agent, or Firm—Jimmy L. Funke

(57) ABSTRACT

An angular accelerometer having a substrate, a plurality of fixed electrodes supported on the substrate and each including fixed capacitive plates, and a rotational inertia mass including a plurality of movable capacitive plates arranged to provide a capacitive coupling with the fixed capacitive plates. The rotational inertia mass is rotationally movable relative to the fixed electrodes in response to angular acceleration. The angular accelerometer further includes support members for supporting the rotational inertia mass and biasing the rotational inertia mass relative to the fixed electrodes during rotational movement of the rotational inertia mass. An input is coupled to the plurality of fixed capacitive plates for receiving an input signal, and an output is coupled to the other of the plurality of fixed and movable capacitive plates for providing an output signal which varies as a function of the capacitive coupling between the fixed and movable capacitive plates and is indicative of angular acceleration.

22 Claims, 3 Drawing Sheets

ANGULAR ACCELEROMETER

CROSS-REFERENCE TO RELATED APPLICATION

This application is related to Application Ser. No. (TBD, identified as DP-300150) entitled "MEMS STRUCTURE AND MICROFABRICATION PROCESS," to John C. Christenson, filed on the same date as the present application.

TECHNICAL FIELD

The present invention generally relates to acceleration sensors and, more particularly, to a rotational acceleration sensor, i.e., angular accelerometer.

BACKGROUND OF THE INVENTION

Angular accelerometers are generally employed to measure the second derivative of angular rotation with respect to time. In certain specialized machine control applications, a measured angular acceleration is often needed as a direct input to a control system. For example, in order to prevent against disturbance from external angular acceleration, disk drive read/write heads generally require a sensor for sensing angular acceleration so that the control system associated therewith may compensate for the severe shock and/or vibrations that may have caused the angular acceleration.

One approach for determining angular acceleration employs an angular velocity sensor to sense angular velocity, and differentiates the sensed angular velocity to determine the angular acceleration. The design for an angular velocity sensor is usually complex, and angular velocity sensors are generally expensive to produce. In addition, the acceleration measuring device typically requires a differentiator which adds to the complexity and overall cost of the device.

Another approach for determining angular acceleration uses a combination of two linear accelerometers mounted to a rigid body for sensing linear acceleration along two respective perpendicular axes. Generally, linear accelerometers employ a mass suspended from a frame by multiple beams. The mass, beams, and frame act as a spring-mass system, such that the displacement of the mass is proportional to the acceleration applied to the frame. The difference in acceleration signals from the two linear orthogonal accelerometers is proportional to the angular acceleration of the rigid body. Linear accelerometers are readily available and easy to use; however, in order to measure angular acceleration while rejecting linear acceleration, the scale factor, i.e., sensitivity or gain, of the two sensors generally must be clearly matched. An example of two discrete linear accelerometers integrated into a single device is disclosed in an article by M. T. White and M. Tomizuka, entitled "Increased Disturbance Rejection in Magnetic Disk Drives by Acceleration Feedforward Control and Parameter Adaptation," published in Control Eng. Practice, Volume 5, No. 6, pages 741–751, dated 1997. The aforementioned article is incorporated herein by reference.

Another approach for an angular accelerometer is disclosed in an article to T. J. Brosnihan et al. entitled "Surface Micromachined Angular Accelerometer with Force Feedback," published in DSC-Vol. 57-2, 1995 IMECE, Proceedings of the ASME Dynamic Systems and Control Division, pages 941–947, ASME, dated 1995. A similar approach is disclosed in U.S. Pat. No. 5,251,484, entitled "ROTATIONAL ACCELEROMETER," which is also incorporated herein by reference. The approach in U.S. Pat. No. 5,251,484 employs a circular hub centrally supported on a substrate and connected to radially disposed thin film spoke electrodes that flex in response to angular acceleration. Rotational acceleration measurement is achieved by using a differential, parallel plate capacitive pick-off scheme in which the flexible spoke electrodes at the periphery of the fixed disk rotate between fixed reference electrodes so that an off-center position of moving electrodes results in a measured differential voltage from which the disk motion is determined. The sensing capability for such an accelerometer is generally limited to the amount of movement of the flexible spoke electrodes.

The aforementioned conventional approaches employs separate input and output contacts for each capacitor plate, which adds to the complexity and cost of the accelerometer. In addition, some of the conventional accelerometers may suffer from errors introduced by rotational acceleration orthogonal to the sensing axis and errors introduced by linear acceleration. It is therefore desirable to provide for a low cost, easy to make and use, angular accelerometer that minimizes error introduction.

SUMMARY OF THE INVENTION

In accordance with the teachings of the present invention, an angular accelerometer is provided having a substrate, a first fixed electrode supported on the substrate and including a first plurality of fixed capacitive plates, and a rotational inertia mass substantially suspended over a cavity and including a plurality of movable capacitive plates arranged to provide a capacitive coupling with the first plurality of fixed capacitive plates. The rotational inertia mass is rotatable relative to said fixed electrode in response to angular acceleration. The angular accelerometer further includes a support member for supporting the rotational inertia mass and biasing the rotational inertia mass relative to the fixed electrode during rotational movement of the rotational inertia mass. An input is coupled to one of the first plurality of capacitive plates and the plurality of movable capacitive plates for receiving an input signal, and an output is coupled to the other of the first plurality of capacitive plates and the plurality of movable capacitive plates for providing an output signal which varies as a function of the capacitive coupling and is indicative of angular acceleration. The plurality of the fixed capacitive plates are electrically coupled together to form a bank of capacitors to provide an easy to use accelerometer.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
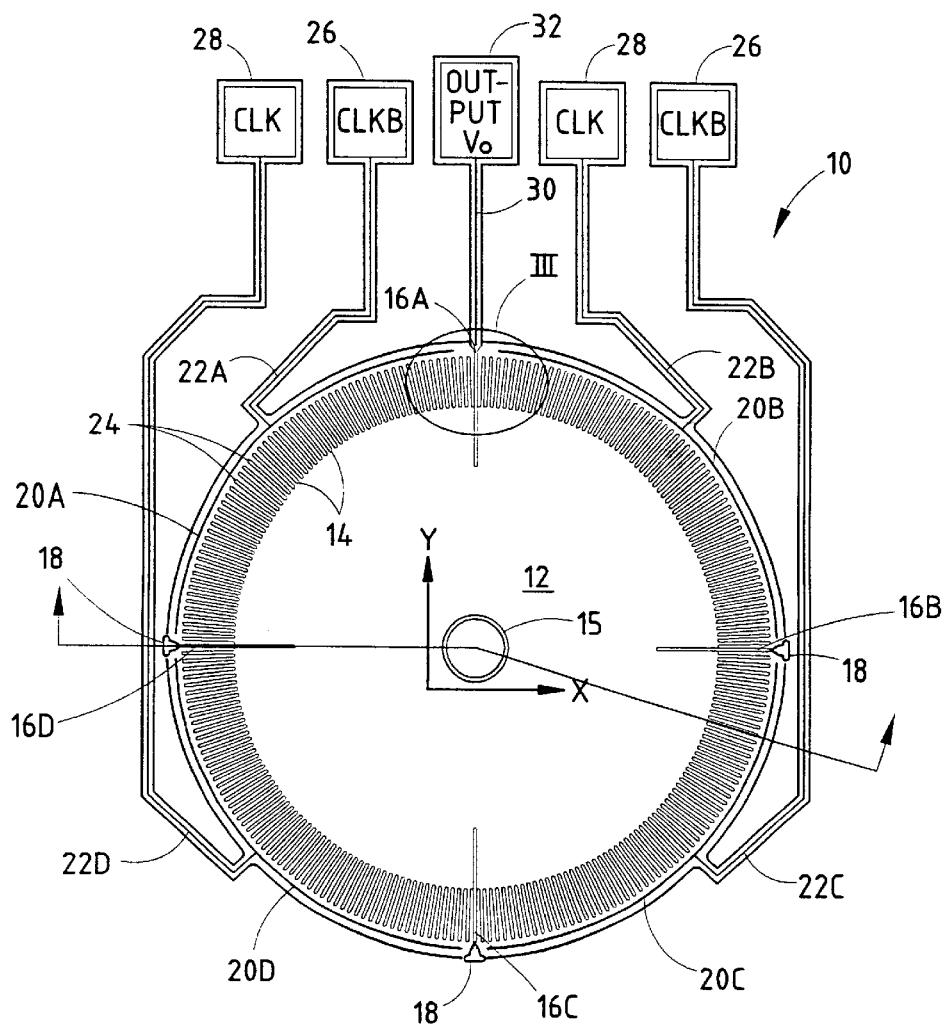
FIG. 1 is a top view of an angular accelerometer formed on a substrate according to the present invention.
Figure 2:
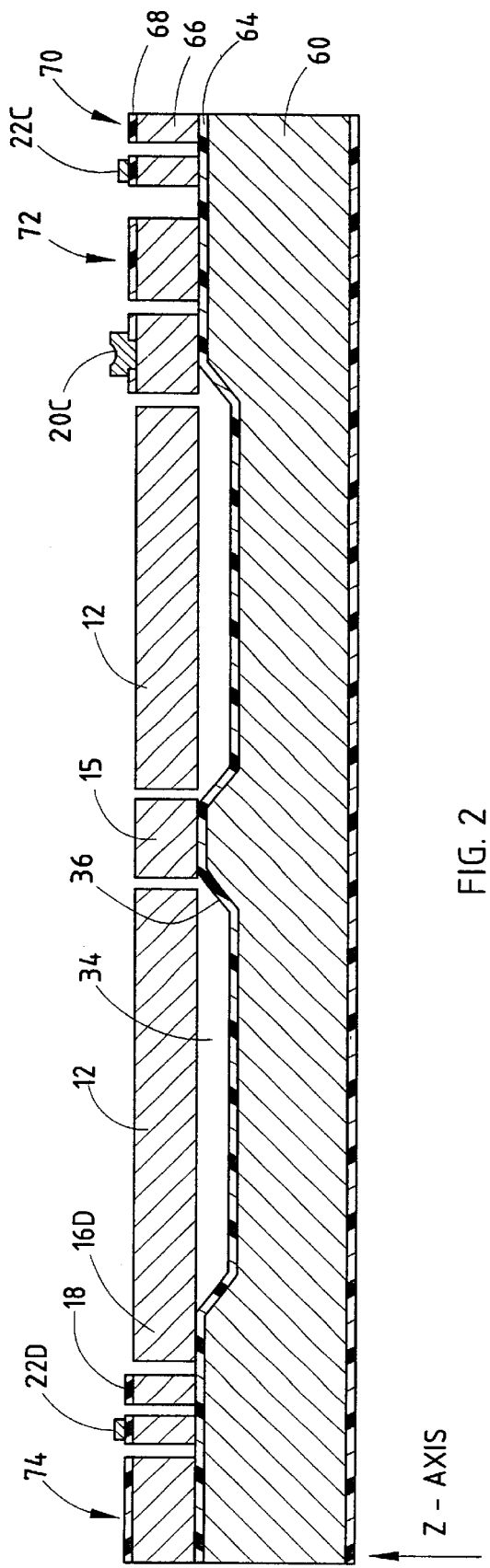
FIG. 2 is a cross-sectional view of the angular accelerometer taken through lines II—II of FIG. 1.

Referring to FIGS. 1 and 2, an angular accelerometer 10 is illustrated according to the present invention for sensing angular acceleration. The angular accelerometer 10 is preferably fabricated on a single crystal silicon substrate 60 using a trench etching process. The etching process may include etching out a pattern from a doped material suspended over a cavity to form a conductive pattern that is partially suspended over the cavity 34. One example of an etching process that may be used to form the angular accelerometer 10 of the present invention is disclosed in related co-filed application Ser. No. (TBD, identified as DP-300150) entitled "MEMS STRUCTURE AND MICRO-FABRICATION PROCESS," which is hereby incorporated by reference. While the angular accelerometer 10 is fabricated on a crystal silicon substrate using a trench etching process, it should be appreciated that accelerometer 10 could be fabricated using other known fabrication techniques, such as an etch and undercut process, without departing from the teachings of the present invention.

The angular accelerometer 10 includes, at its center region, a generally disk-shaped rotational inertia mass 12 suspended over a cavity 34, and a stationary center member 15 supported on a pedestal 36. The rotational inertia mass 12 has a plurality of rigid comb-like conductive fingers 14 extending radially outward from the peripheral edge that serve as capacitive plates. The rotational inertia mass 12 is a movable mass that may rotate angularly about the Z-axis, along with the comb-like conductive fingers 14, when subjected to an angular acceleration about the planar Z-axis of the angular accelerometer 10. For purposes of discussion herein, the X-Y plane is defined as the plane formed by the X-axis and Y-axis as oriented in FIG. 1, while the Z-axis is defined as the planar axis which extends perpendicular to the X-Y plane as shown in FIG. 2.

The rotational inertia mass 12 is generally suspended above a cavity 34 and is suspended at its periphery via four radial support arms, i.e., tethers, 16A–16D. Support arms 16A–16D are equi-angularly spaced every ninety degrees and are attached to a thick oxide insulation layer 64 on the supporting substrate 16. The four radial support arms 16A–16D are flexible beams that act as springs which are compliant to bending perpendicular to the beam's longitudinal axis in the X-Y plane, but are relatively stiff to bending out of the X-Y plane in the Z-axis. The support arms 16A–16D may have a thickness in the range of 20–50 micrometers and a width in the range of 2–5 micrometers. According to one example, support arms 16A–16D may have a thickness of approximately 30 micrometers as compared to a width of approximately 5 micrometers to provide a sufficient aspect ratio of thickness to width to allow for flexibility in the X-Y plane and stiffness in the Z-axis. In addition, slots 17 may be etched on both sides of each of support arms 16A–16D extending from the perimeter of mass 12 radially inward to provide for an increased effective length of angular flexibility of support arms 16A–16D. The four support arms 16A–16D thereby substantially suspend the rotational inertia mass 12 above the cavity 34 in the X-Y plane, and yet allow angular rotation about the Z-axis when subjected to angular acceleration about the Z-axis. Because two pairs of opposing radial support arms 16A–16D are employed, the entire structure is stiff with respect to linear accelerations in the X-Y plane. Yet, the rotational inertia mass 12 is free to rotate about the Z-axis within the constraints of the support arms 16A–16D.

The thick oxide insulation layer 64 and substrate 60 provide a fixed support located radially outward from the perimeter of rotational inertia mass 12. Each of support arms 16A–16D are fixedly attached to the thick oxide insulation layer 64. Included in the radial support are three isolators 18 which dielectrically isolate the rotational inertia mass 12 from signal lines 22A–22D. Also, fixed to the thick oxide insulation layer 64 on top of substrate 60 are four fixed electrodes 20A–20D, each having a plurality of fixed capacitive plates 24 interdisposed between adjacent movable capacitor plates 14 of rotational inertia mass 12, to form four banks of variable capacitors.

The first fixed electrode 20A has a clock input line 22A for receiving a square wave clock signal CLKB 26. The plurality of fixed capacitive plates 24 provided with the first electrode 20A are interdisposed between adjacent movable capacitive plates 14 of rotational inertia mass 12 for approximately one-quarter rotation of inertia mass 12, to provide a first bank of capacitors. The second fixed electrode 20B likewise has a plurality of fixed comb-like capacitive plates 24 interdisposed between adjacent movable capacitive plates 14 of inertia mass 12 for approximately one-quarter of its rotation, to provide a second bank of capacitors. The second fixed electrode 20B has a clock input line 22B for receiving a square wave clock CLK 28. The third fixed electrode 20C also includes a plurality of fixed comb-like capacitive plates 24 for approximately one-quarter of movable capacitive plates 14 of inertia mass 12, to provide a third bank of capacitors, and likewise receives clock signal CLKB 26 via input line 22C. The fourth fixed electrode 20D has a plurality of fixed capacitive plates 24 for approximately the remaining one-quarter of the movable capacitive plates 14 of inertia mass 12, to provide a fourth bank of capacitors, and receives clock signal CLK 28 via clock input line 22D.

Each of the fixed electrode plates 20A–20D is formed about the outer perimeter of the rotational inertia mass 12 through an angular rotation of approximately ninety degrees. The fixed electrodes 20A–20D and corresponding plurality of fixed capacitive plates 24 are fixed in place supported on top of insulation layer 64 and substrate 60. Accordingly, the rotational inertia mass 12 and its rigid outer peripheral capacitive plates 14 are able to move relative to fixed capacitive plates 24 in response to a rotational acceleration about the Z-axis. The rotational inertia mass 12 and capacitive plates 14 are electrically conductive and are electrically connected via an output line 30 to output pad 32 for providing an output voltage $V_O$. The output voltage $V_O$ provides a voltage level indicative of the angular rotation of the rotational inertia mass 12 relative to the fixed electrodes 20A–20D due to angular acceleration about the Z-axis. Accordingly, by measuring the output voltage $V_O$ at output pad 32, the angular accelerometer 10 provides an indication of the angular acceleration experienced.

With particular reference to FIG. 2, the angular accelerometer 10 is further shown taken through a cross section. The angular accelerometer 10 includes substrate 60 which serves as the underlying support. Substrate 60 may include a silicate substrate having the thick oxide insulation layer 64 formed on the top surface, and a bottom oxide insulation layer 62 formed on the bottom surface. The substrate 60 may include silicate, or alternate materials such as glass or stainless steel, for example. The substrate 60 and oxide insulation layer 64 are configured to provide a cavity 34 below rotational inertia mass 12. Additionally, substrate 60 and oxide layer 64 may provide a central pedestal 36 for purposes of providing support during the fabrication process.

Formed above the substrate 60 and oxide insulation layer 64 is an EPI layer 66. EPI layer 66 is made of a conductive material and is etched to form various components including the rotational inertia mass 12, central member 15, isolators 22A–22D, and outer isolation walls 70 and 74. The EPI layer 66 preferably has a thickness in the range of 20–50 micrometers, and more preferably of approximately 30 micrometers. With the exception of the rotational mass inertia 12, the EPI layer 66 further includes a field passivation layer 68 disposed in the top surface thereof. The conductive signal paths 20A–20D and 22A–22D are formed on top of the dielectric field passivation layer 68 as shown to provide single layer signal transmission paths.

It should be appreciated that the angular accelerometer 10 may be formed by disposing the oxide insulation layer 64, EPI layer 66, and insulation field passivation layer 68 on top of substrate 60. Preferably, the cavity 34 is initially provided as a vacuum cavity. Prior to the etching process, the central pedestal 36 provides structural support for EPI layer 66 to allow the rotational inertia mass 12 to be suspended over the cavity 34. By providing a central pedestal 36, the structural integrity of the accelerometer is enhanced during the fabrication process. After the etching process, the central pedestal 36 supports only the central member 15 which is completely separated from rotational mass 12. By supporting the EPI layer 66 in the central region during the manufacturing process, the maximum stress experienced is greatly reduced. This allows for use of larger cavity sizes for a given thickness of EPI layer, resulting in greater sensitivity for signal-to-noise ratio. It should be appreciated that the angular accelerometer 10 could be provided without the central pedestal 36 and member 15, such that the rotational inertia mass 12 is extended through its central portion thereof, in place of member 15, and is suspended over cavity 34 throughout the central region.

Figure 3:
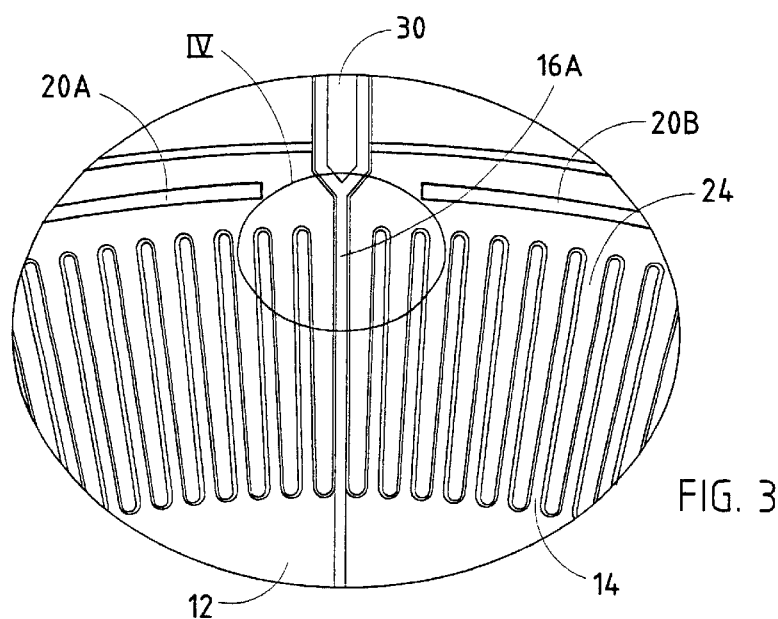
FIG. 3 is an enlarged view of section III of FIG. 1.

Referring to FIG. 3, a portion of the angular accelerometer 10 is further illustrated therein. Support arm 16A is formed as a continuous conductive signal line which continues from the rotational inertia mass 12 to signal line 30. Accordingly, support arm 16A provides a conductive path for the output signal voltage $V_O$ collected on the capacitive plates 14 for transmission onto signal path 30. At the same time, support arm 16A provides rigid vertical support in the Z-axis while allowing for angular rotation about the vertical Z-axis. The remaining support arms 16B–16D are fixed to isolators 18 which in turn are fixed to insulation layer 64.

Figure 4:
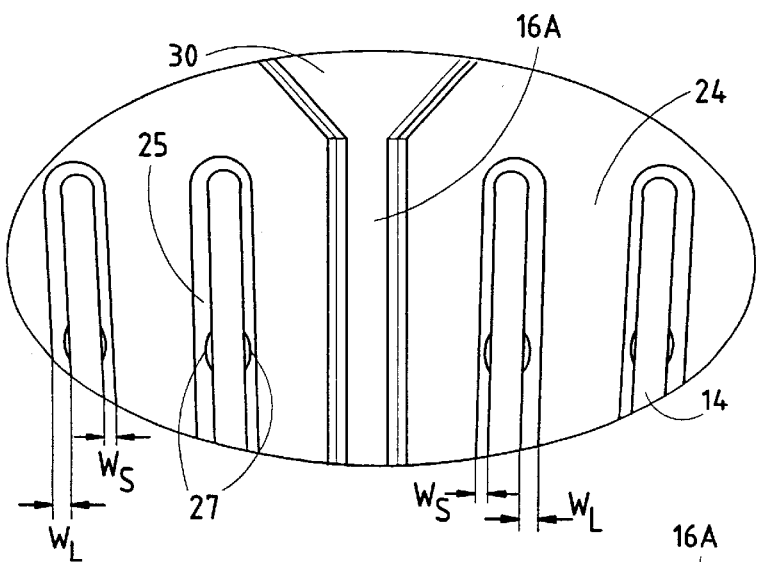
FIG. 4 is a further enlarged view of section IV of FIG. 3.

Referring to FIG. 4, a further enlarged view of a portion of the angular accelerometer 10 is shown therein. The fixed capacitive plates 24 are interdisposed between adjacent movable capacitive plates 14 and separated one from another via an air gap 25. The air gap 25 between capacitive plates 14 and 24 allows for movable capacitive plates 14 to move relative to the fixed capacitive plates 24. Each of movable capacitive plates 14 has a very small mass as compared to the rotational inertia mass 12, and are rigid to prevent rotary movement relative to rotational mass 12. Additionally, the movable and fixed capacitive plates 14 and 24, respectively, each has a thickness equal to the thickness of EPI layer 66. Because total change in capacitance is proportional to the thickness of the capacitive plates 14 and 24, the signal-to-noise ratio is enhanced with enlarged thickness.

As is apparent in FIG. 4, the air gap 25 between capacitive plates 14 and 24 is greater on one side of plate 14 as compared to the other side. For example, on the bank of capacitors formed by fixed electrode 20B, the width $W_L$ of air gap 25 between capacitive plates 14 and 24 on the right side of support arm 16A is approximately twice the width $W_S$ of the air gap present on the left side of support arm 16A. The air gap 25 between adjacent capacitive plates 14 and 24 is configured substantially the same for each of the fixed capacitive plates 24 connected to the fixed electrode. However, for adjacent fixed electrodes 20A and 20C, the orientation of the conductive plates 14 and 24 is switched in that the larger gap width $W_L$ and smaller gap width $W_S$ of air gap 25 is on the opposite side as compared to the adjacent fixed electrodes. For example, the fixed capacitive plates 24 on fixed electrode 20A are separated from movable capacitive plates 14 by an air gap 25 of width $W_L$ twice as wide on the left side as the width $W_S$ on the right side, while fixed electrode 20B is configured with a larger air gap width $W_L$ on the right side of plate 14 as compared to its left side. Additionally, each of movable capacitive plates 14 has a pair of enlarged motion stop beads 27 for limiting the relative movement between capacitive plates 14 and 24, in the event excessive angular acceleration is experienced.

Figure 5:
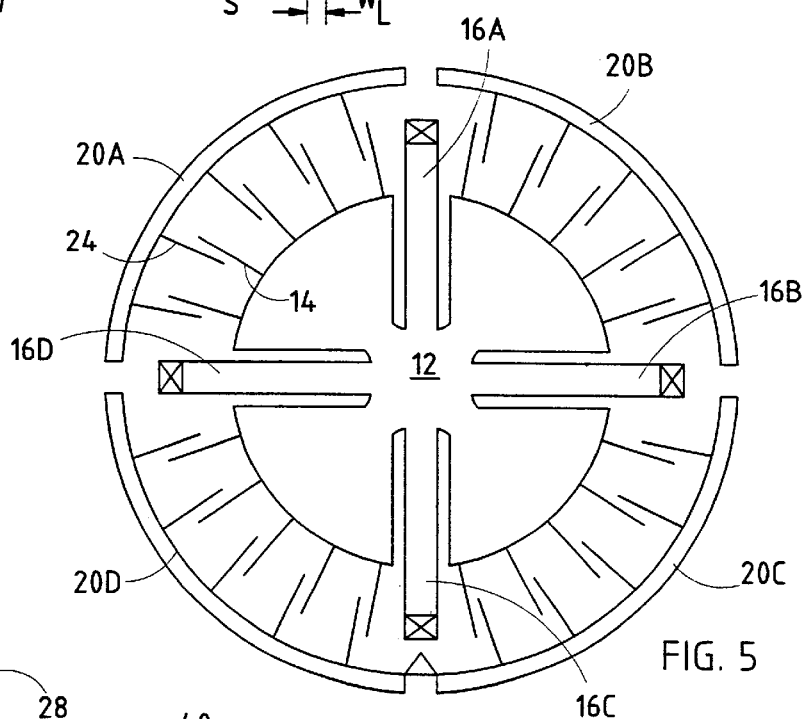
FIG. 5 is a schematic diagram further illustrating the angular accelerometer.

Referring to FIG. 5, the angular accelerometer 10 is generally shown in a schematic view to illustrate the four banks of variable capacitors formed by capacitive plates 24 and 14. As shown, the capacitive plates 24 associated with fixed electrodes 20A and 20C have a certain positive to negative orientation with respect to movable capacitive plates 14. In contrast, the positive to negative orientation between capacitive plates 24 and 14 for the fixed electrodes 20B and 20D are arranged oppositely. By alternating the orientation of the polarity of the four banks of capacitors in the four equi-angular sections as disclosed, the angular accelerometer 10 of the present invention essentially nulls out any cross-axis acceleration and linear acceleration, and allows for angular acceleration to be sensed about the Z-axis. Further, by employing a plurality of fixed capacitive plates 24 commonly connected on fixed electrodes 20A–20D, the present invention advantageously reduces the number of signal input and output lines that would otherwise be required.

Figure 6:
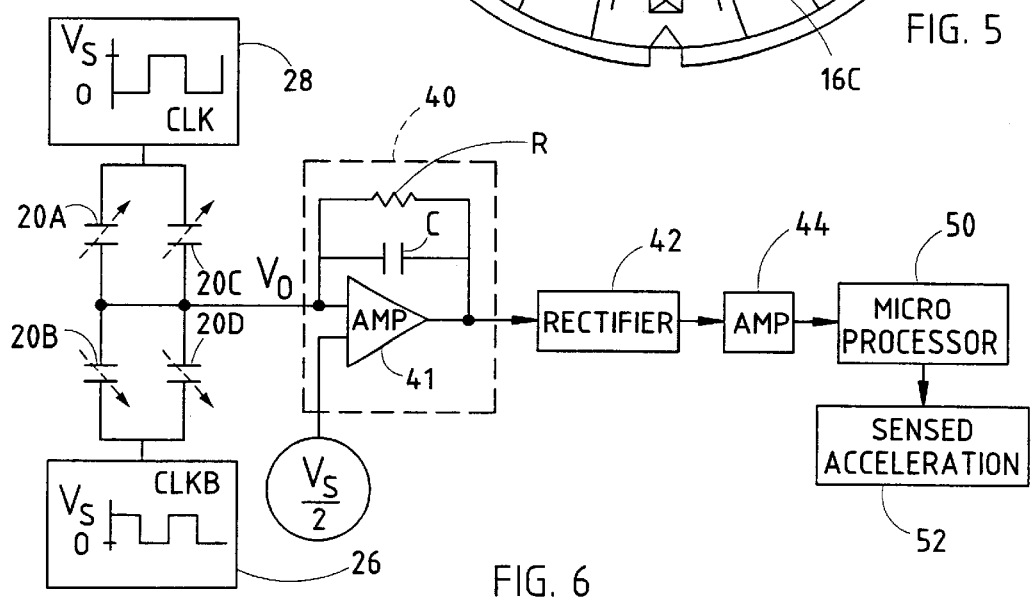
FIG. 6 is a circuit diagram illustrating processing circuitry coupled to the angular accelerometer.

With particular reference to FIG. 6, the fixed electrodes 20A–20D are generally shown receiving clock signals CLKB 26 and CLK 28 and are connected to processing circuitry. Clock signals CLKB 26 and CLK 28 are rectangular, e.g., square, wave generated signals that have alternating voltage levels of $V_s$ and 0 volts. Clock signal CLKB 26 is 180 degrees out of phase, i.e., inverse, as compared to clock CLK 28, and therefore provides an opposite phase rectangular waveform. The processing circuitry includes a buffer circuit 40 having a resistor R, a capacitor C, and an amplifier 41. The amplifier 41 receives a signal $V_s/2$. Connected to the output of buffer circuit 40 is a rectifier 42 for rectifying the buffered output, and an amplifier 44 for amplifying the rectified signal. A microprocessor 50 receives the amplified signal from amplifier 44 and produces an angular acceleration value 52. The angular acceleration value 52 is computed in proportion to the magnitude of the sensed output voltage $V_O$.

The angular accelerometer 10 provides a measurement of the angular acceleration about the Z-axis, while not responding to cross-accelerations and linear accelerations. In doing so, the rotational inertia mass 12, when subjected to an angular acceleration about the Z-axis, rotates about the Z-axis relative to the fixed electrodes 20A–20D and within the restraining limits of the support arms 16A–16D. If the mass 12 is rotated in a positive direction about the Z-axis, the opposing banks of variable capacitors formed by fixed electrodes 20A and 20C increase in capacitance, while the opposing banks of variable capacitors formed by electrodes 20B and 20D decrease in value, or vice versa. The change in capacitance provides for a voltage output signal $V_O$ indicative of the angular acceleration experienced.

The angular accelerometer 10 of the present invention is particularly well suited for use in a disk drive system to sense angular acceleration on the drive's disk head assembly, so that the disk drive system may compensate for the angular acceleration to thereby null out any adverse affects. However, it should be appreciated that the angular accelerometer 10 may be used in various other applications.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An angular accelerometer comprising:

a substrate;

a first fixed electrode supported on the substrate and including a first plurality of fixed capacitive plates;

a rotational inertia mass substantially suspended over a cavity and including a plurality of movable capacitive plates arranged to provide a capacitive coupling with said first plurality of fixed capacitive plates, said rotational inertia mass being rotationally movable relative to said first fixed electrode;

a support member for supporting said rotational inertia mass and biasing said rotational inertia mass relative to said fixed electrode during rotational movement of the rotational inertia mass;

an input coupled to one of said first plurality of fixed capacitive plates and said plurality of movable capacitive plates for receiving an input signal; and an output coupled to the other of said first plurality of fixed capacitive plates and said plurality of movable capacitive plates for providing an output signal which varies as a function of said capacitive coupling and is indicative of angular acceleration.

2. The angular accelerometer as defined in claim 1, wherein said first plurality of fixed capacitive plates and the movable capacitive plates capacitively coupled thereto form a first bank of capacitors.

3. The angular accelerometer as defined in claim 2 further comprising a second fixed electrode having a second plurality of fixed capacitive plates forming a capacitive coupling with some of said plurality of movable capacitive plates to form a second bank of capacitors.

4. The angular accelerometer as defined in claim 3, wherein the first bank of capacitors receives a first oscillating wave signal, and the second bank of capacitors receives a second oscillating wave signal which is approximately 180 degrees out of phase from said first oscillating wave signal.

5. The angular accelerometer as defined in claim 4 further comprising third and fourth fixed electrodes each having fixed capacitive plates forming capacitive couplings with movable capacitive plates to provide third and fourth banks of capacitors, wherein said banks of capacitors have oppositely phased signals.

6. The angular accelerometer as defined in claim 1, wherein said rotational inertia mass is substantially centrally located, and said first fixed electrode is radially displaced from said rotational inertia mass.

7. The angular accelerometer as defined in claim 1, wherein said accelerometer is fabricated on a silicon substrate by a trench etching process.

8. The angular accelerometer as defined in claim 1, wherein said output is connected to a circuit having an amplifier.

9. The angular accelerometer as defined in claim 1, wherein said support member comprises a plurality of support arms extending radially outward from said rotational inertia mass.

10. The angular accelerometer as defined in claim 9, wherein said plurality of support arms comprises four equiangular located arms.

11. The angular accelerometer as defined in claim 9, wherein each of said support arms are flexible so as to bend during angular acceleration about one axis, yet rigid to resist bending due to acceleration about other axes.

12. An angular accelerometer comprising:

a first bank of variable capacitors formed of a first plurality of fixed capacitive plates and a first plurality of movable capacitive plates;

a second bank of variable capacitors formed of a second plurality of fixed capacitive plates and a second plurality of movable capacitive plates;

a rotational inertia mass that is rotatable in response to angular acceleration and is electrically coupled to said first and second plurality of movable capacitive plates and arranged so that said first and second movable capacitive plates form capacitive couplings with said first and second plurality of fixed capacitive plates;

a support member supporting said rotational inertia mass and movable capacitive plates, and biasing said rotational inertia mass and movable capacitive plates relative to said first and second fixed capacitive plates during rotational movement of the rotational inertia mass;

a first input coupled to said first plurality of fixed capacitive plate;

a second input coupled to said second plurality of fixed capacitive plates; and an output electrically coupled to said plurality of movable capacitive plates for sensing an output signal indicative of angular acceleration in response to rotation of said rotational inertia mass.

13. The angular accelerometer as defined in claim 12 further comprising:

a third bank of variable capacitors formed by a third plurality of fixed capacitive plates and a third plurality of movable capacitive plates; and a fourth bank of variable capacitors formed by a fourth plurality of fixed capacitive plates and a fourth plurality of movable capacitive plates.

14. The angular accelerometer as defined in claim 13, wherein said third plurality of fixed capacitive plates are coupled to said first input and said fourth plurality of fixed capacitive plates are coupled to said second input.

15. The angular accelerometer as defined in claim 14, wherein said first and second inputs receive oppositely phased signals.

16. The angular accelerometer as defined in claim 12, wherein said rotational inertia mass is substantially centrally located, and said fixed capacitive plates are radially displaced from said rotational inertia mass.

17. The angular accelerometer as defined in claim 12, wherein said angular accelerometer is fabricated on a silicon substrate using a trench etching process.

18. The angular accelerometer as defined in claim 12, wherein said output is coupled to a circuit having an amplifier.

19. The angular accelerometer as defined in claim 12, wherein said support member comprises a plurality of support arms extending radially outward from said rotational inertia mass.

20. The angular accelerometer as defined in claim 19, wherein said plurality of support arms comprises four equiangularly located arms.

21. The angular accelerometer as defined in claim 19, wherein each of said support arms are flexible so as to bend during angular acceleration about one axis, yet rigid to resist bending due to acceleration about other axes.

22. The angular accelerometer as defined in claim 12, wherein said movable capacitive plates are rigid.

* * * * *